United States Patent
Ogata et al.

(10) Patent No.: US 11,760,201 B2
(45) Date of Patent: Sep. 19, 2023

(54) VEHICLE DISPLAY DEVICE, VEHICLE DISPLAY METHOD AND RECORDING MEDIUM RECORDING VEHICLE DISPLAY PROGRAM

(71) Applicant: TOYOTA JIDOSHA KABUSHIKI KAISHA, Aichi-ken (JP)

(72) Inventors: Ryo Ogata, Toyota (JP); Satoaki Takabatake, Nissin (JP); Koji Kimura, Nagoya (JP); Junji Miyazaki, Nagoya (JP); Yuki Yoshida, Toyota (JP); Tadashi Morishita, Kariya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 33 days.

(21) Appl. No.: 17/032,828

(22) Filed: Sep. 25, 2020

(65) Prior Publication Data

US 2021/0162865 A1 Jun. 3, 2021

(30) Foreign Application Priority Data

Dec. 2, 2019 (JP) ................. 2019-218243

(51) Int. Cl.
  *B60K 35/00* (2006.01)
  *G06F 3/14* (2006.01)
  *B60W 60/00* (2020.01)
  *B60W 50/14* (2020.01)

(52) U.S. Cl.
  CPC ............ *B60K 35/00* (2013.01); *B60W 50/14* (2013.01); *B60W 60/001* (2020.02); *B60W 60/0053* (2020.02); *G06F 3/1423* (2013.01); *B60K 2370/1529* (2019.05); *B60K 2370/16* (2019.05); *B60W 2050/146* (2013.01)

(58) Field of Classification Search
  None
  See application file for complete search history.

(56) References Cited

U.S. PATENT DOCUMENTS

| 8,346,426 B1 * | 1/2013 | Szybalski ............ G06T 11/001 701/28 |
| 2009/0112462 A1 * | 4/2009 | Lo ...................... G01C 21/3632 701/533 |
| 2011/0241853 A1 | 10/2011 | Harbach et al. |
| 2017/0160552 A1 * | 6/2017 | Muramatsu ........ G02B 27/0101 |

(Continued)

FOREIGN PATENT DOCUMENTS

| JP | 2002357439 A | 12/2002 |
| JP | 2006284458 A | 10/2006 |

(Continued)

*Primary Examiner* — Jean Paul Cass
*Assistant Examiner* — Andrew Sang Kim
(74) *Attorney, Agent, or Firm* — HAUPTMAN HAM, LLP (57) ABSTRACT

A vehicle display device, that includes: a first display device provided inside a vehicle cabin; a second display device provided inside the vehicle cabin and separately from the first display device; a memory; and a processor connecting to the memory and being configured to: set a running plan of a vehicle, to display a scheduled action of the vehicle on the first display device based on the running plan, and to display the scheduled action on the second display device in a case in which at least one of a distance to, or a time interval until, the scheduled action has reached a prescribed value or less.

16 Claims, 10 Drawing Sheets

(56) References Cited

U.S. PATENT DOCUMENTS

2019/0204827 A1* 7/2019 Bhalla .................. B60W 50/14
2020/0249044 A1* 8/2020 Watanabe .............. B60K 35/00

FOREIGN PATENT DOCUMENTS

| JP | 2018-100867 A | 6/2018 |
| JP | 201918770 A | 2/2019 |
| JP | 2019-119262 A | 7/2019 |
| WO | 2019198615 A1 | 10/2019 |

* cited by examiner

VEHICLE DISPLAY DEVICE, VEHICLE DISPLAY METHOD AND RECORDING MEDIUM RECORDING VEHICLE DISPLAY PROGRAM

CROSS-REFERENCE TO RELATED APPLICATION

This application is based on and claims priority under 35 USC 119 from Japanese Patent Application No. 2019-218243 filed on Dec. 2, 2019, the disclosure of which is incorporated by reference herein.

BACKGROUND

Technical Field

The present disclosure relates to a vehicle display device, a vehicle display method and a non-transitory recording medium recording a vehicle display program therein.

Related Art

Japanese Patent Application Laid-Open (JP-A) No. 2018-100867 discloses a display device that finds a route to guide a vehicle to a destination, and displays the route on a display. The display performed by the display device disclosed in JP-A No. 2018-100867 enables autonomous driving segments where the vehicle is autonomously driven to be differentiated from manual driving segments where manual driving is required.

However, in the display device disclosed in JP-A No. 2018-100867, a large amount of information is displayed by a display section, and so it might take some time for an occupant to ascertain a scheduled action of the vehicle.

SUMMARY

An aspect of the disclosure is a vehicle display device, that includes: a first display device provided inside a vehicle cabin; a second display device provided inside the vehicle cabin and separately from the first display device; a memory; and a processor connecting to the memory and being configured to: set a running plan of a vehicle, to display a scheduled action of the vehicle on the first display device based on the running plan, and to display the scheduled action on the second display device in a case in which at least one of a distance to, or a time interval until, the scheduled action has reached a prescribed value or less.

DESCRIPTION OF EMBODIMENTS

Figure 1:
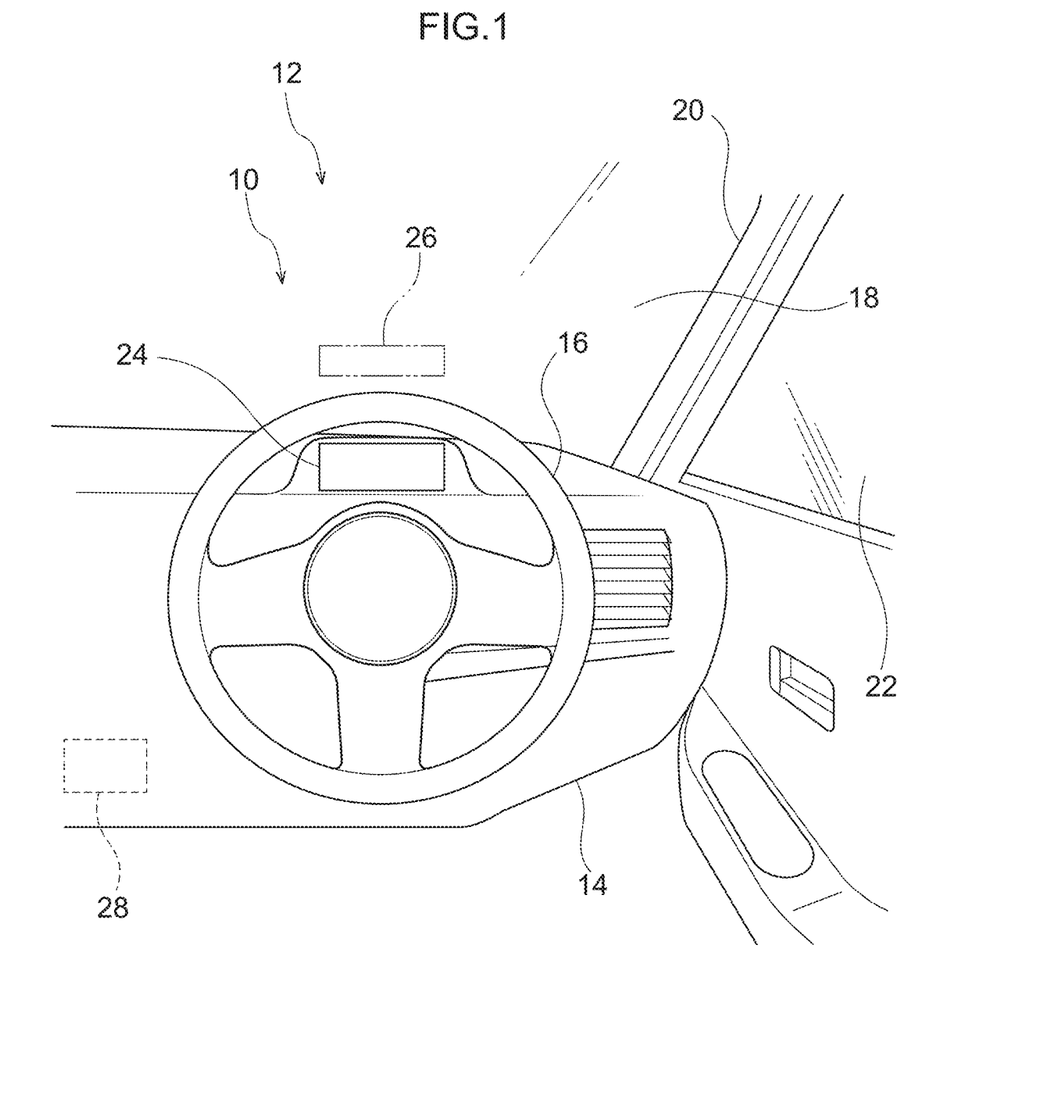
FIG. 1 is a schematic view illustrating a front section of the inside of a cabin of a vehicle applied with a vehicle display device according to an exemplary embodiment, as viewed from a vehicle rear side.

Explanation follows regarding a vehicle 12 applied with a vehicle display device 10 according to an exemplary embodiment, with reference to the drawings. Note that the vehicle 12 of the present exemplary embodiment is for example configured so as to be capable of switching between autonomous driving and manual driving. As illustrated in FIG. 1, an instrument panel 14 is provided at a front section of the inside of a cabin of the vehicle 12.

The instrument panel 14 extends along a vehicle width direction. A steering wheel 16 is provided on a vehicle right side of the instrument panel 14. Namely, in the present exemplary embodiment as an example, the vehicle is a right-hand drive vehicle in which the steering wheel 16 is provided on the right side and a driving seat is set on the vehicle right side.

Windshield glass 18 is provided at a front end portion of the instrument panel 14. The windshield glass 18 extends along a vehicle vertical direction and the vehicle width direction so as to partition the cabin interior from the cabin exterior.

A vehicle right end portion of the windshield glass 18 is fixed to a front pillar 20 on the right side of the vehicle. The front pillar 20 extends along the vehicle vertical direction, and the windshield glass 18 is fixed to a vehicle width direction inner end portion of the front pillar 20. A front end portion of front side glass 22 is fixed to a vehicle width direction outer end portion of the front pillar 20. Note that a vehicle left end portion of the windshield glass 18 is fixed to a front pillar on the left side of the vehicle.

A first display device 24 is provided to the instrument panel 14. The first display device 24 is provided to the instrument panel 14 so as to be located at the vehicle front side of the driving seat, and is provided at a position that falls within the field of view of a driver in a state in which the driver is directing their gaze toward the vehicle front side.

A projection surface projected onto by a second display device 26 is provided on the windshield glass 18. The second display device 26 is set at the vehicle upper side of the first display device 24, and is configured by a head up display device 44 (see FIG. 2) that projects onto the projection surface. To explain this in more detail, the head up display device 44 is provided further toward the vehicle front side than the instrument panel 14, and an image from the head up display device 44 is projected onto the windshield glass 18.

Hardware Configuration of Vehicle Display Device 10

Figure 2:
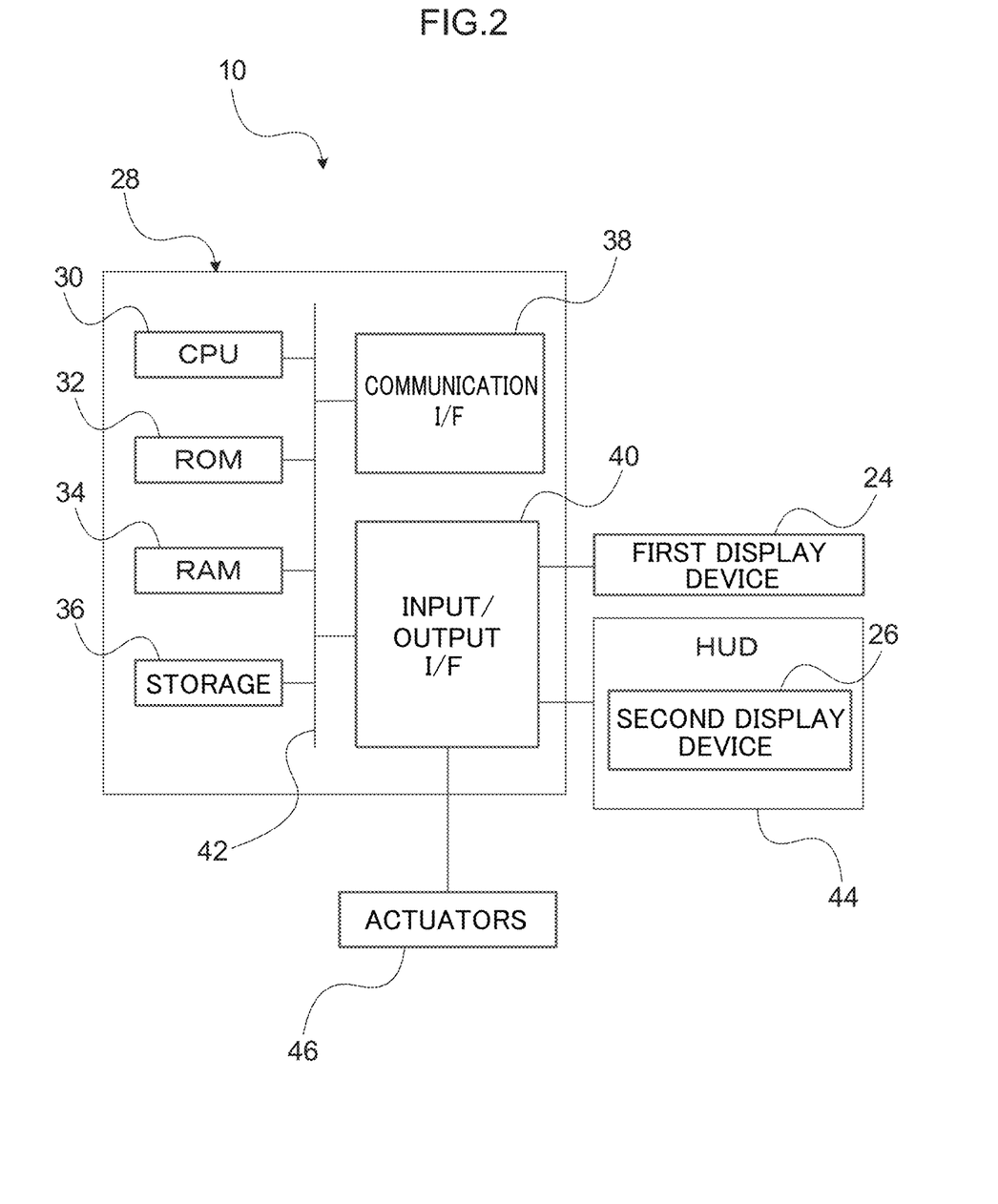
FIG. 2 is a block diagram illustrating a hardware configuration of a vehicle display device according to an exemplary embodiment.

An electronic control unit (ECU) 28, serving as a control section, is provided to the vehicle 12. FIG. 2 is a block diagram illustrating a hardware configuration of the vehicle display device 10. As illustrated in FIG. 2, the ECU 28 of the vehicle display device 10 is configured including a central processing unit (CPU: processor) 30, read only memory (ROM) 32, random access memory (RAM) 34, storage 36, a communication interface 38, and an input/output interface 40. The respective configurations are connected together so as to be capable of communicating with each other through a bus 42.

The CPU 30 is a central processing unit that executes various programs and controls various sections. Namely, the CPU 30 reads a program from the ROM 32 or the storage 36, and executes the program using the RAM 34 as a workspace. The CPU 30 controls the above-mentioned configurations and performs various computation processing based on the program recorded in the ROM 32 or the storage 36.

The ROM 32 holds various programs and various data. The RAM 34 acts as a workspace to temporarily store programs and data. The storage 36 is configured by a hard disk drive (HDD) or a solid state drive (SSD), and holds various programs including an operating system, as well as various data. In the present exemplary embodiment, a program, various data, and the like for performing display processing are held in the ROM 32 or the storage 36.

The communication interface 38 is an interface enabling the vehicle display device 10 to communicate with a server and other equipment, and employs a protocol such as LTE, FDDI, or Wi-Fi (registered trademark).

The first display device 24, the head up display device 44 that projects images onto the second display device 26, and actuators 46 are connected to the input/output interface 40. The actuators 46 are configured including a steering actuator, an accelerator actuator, and a brake actuator. The steering actuator performs steering of the vehicle 12. The accelerator actuator performs acceleration of the vehicle 12. The brake actuator controls the brakes to perform deceleration of the vehicle 12. Note that various sensors, a GPS device, and the like employed during autonomous running of the vehicle 12 are also connected to the input/output interface 40.

Functional Configuration of Vehicle Display Device 10

The vehicle display device 10 implements various functions using the above-described hardware resources. Explanation follows regarding functional configurations implemented by the vehicle display device 10, with reference to FIG. 3.

Figure 3:
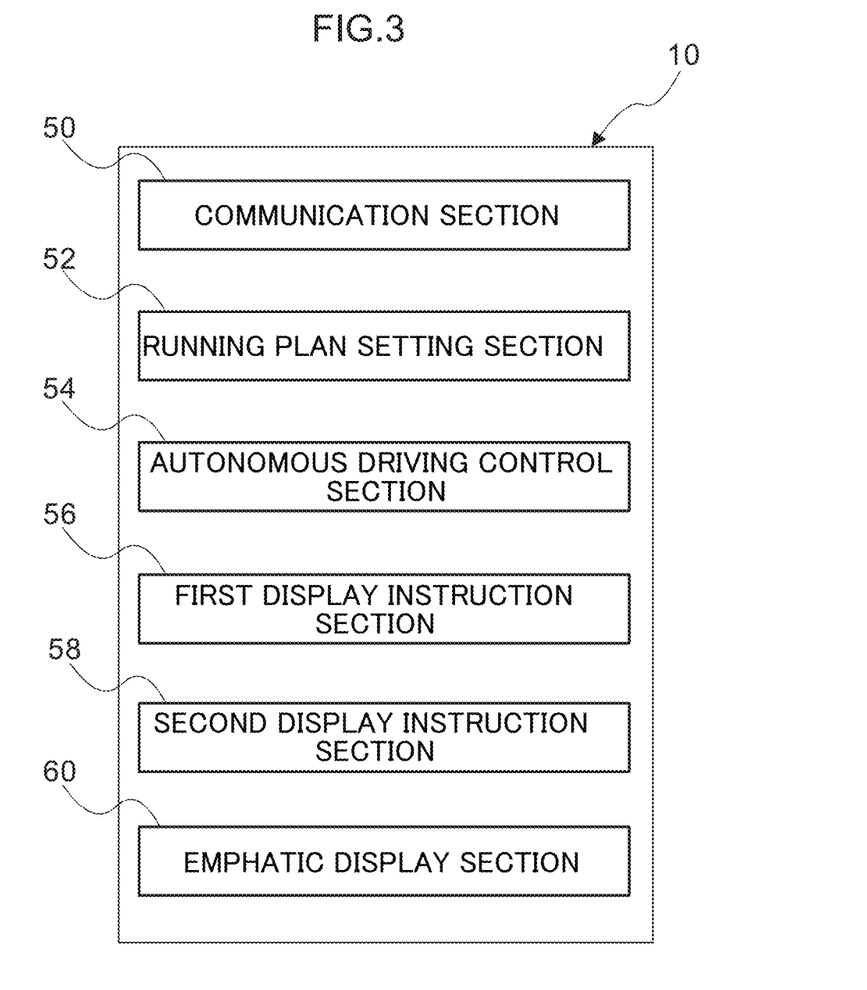
FIG. 3 is a block diagram illustrating a functional configuration of a vehicle display device according to an exemplary embodiment.

As illustrated in FIG. 3, the vehicle display device 10 is configured including a communication section 50, a running plan setting section 52, an autonomous driving control section 54, a first display instruction section 56, a second display instruction section 58, and an emphatic display section 60 as functional configuration. The respective functional configurations are implemented by the CPU 30 reading and executing a program stored in the ROM 32 or the storage 36.

The communication section 50 exchanges data with an external server and other equipment through the communication interface 38. Examples of the data exchanged include map data and traffic conditions that are held on the server. The communication section 50 may be configured to perform vehicle-to-vehicle communication with vehicles in the surroundings.

The running plan setting section 52 sets a running plan for the vehicle 12. To explain this in more detail, when an occupant inputs a destination, the running plan setting section 52 sets a running plan from the current location to the destination.

The autonomous driving control section 54 causes the vehicle 12 to run autonomously according to the set running plan while taking into consideration position information and environmental information regarding the surroundings of the vehicle 12. To explain this in more detail, the autonomous driving control section 54 controls the actuators 46 so as to cause the vehicle 12 to run autonomously.

The first display instruction section 56 displays scheduled actions of the vehicle 12 on the first display device 24 based on the running plan set by the running plan setting section 52. Explanation follows regarding the functionality of the first display instruction section 56, with reference to FIG. 4B, FIG. 5B, and FIG. 6B.

Figure 4A:
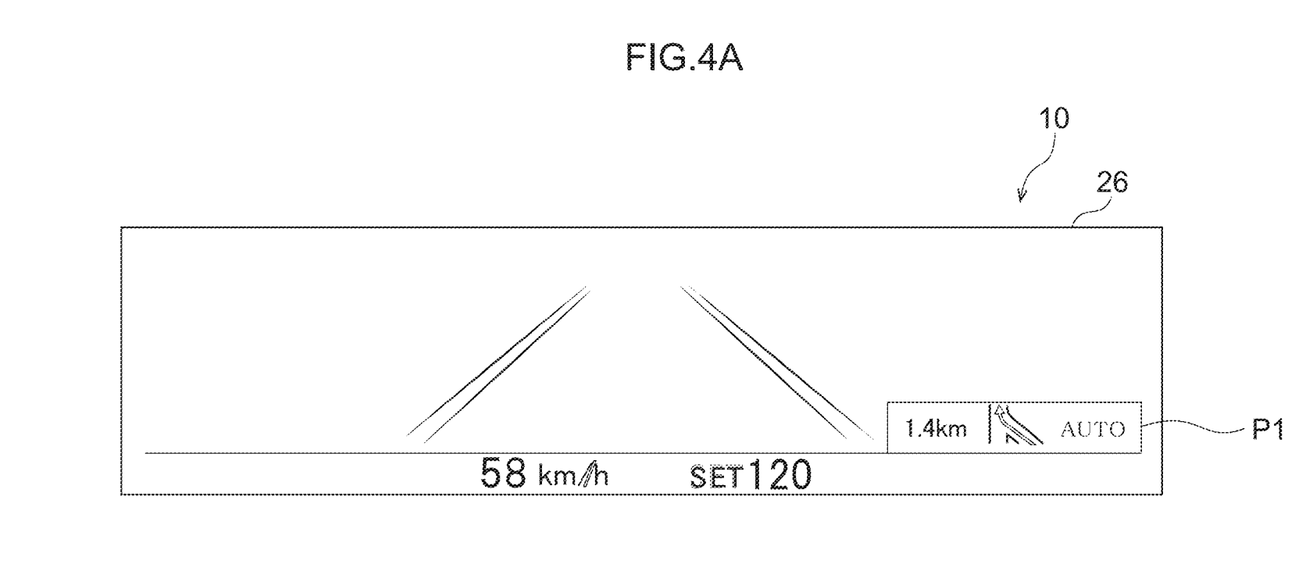
FIG. 4A is a diagram illustrating an example of a display on a second display device.
Figure 4B:
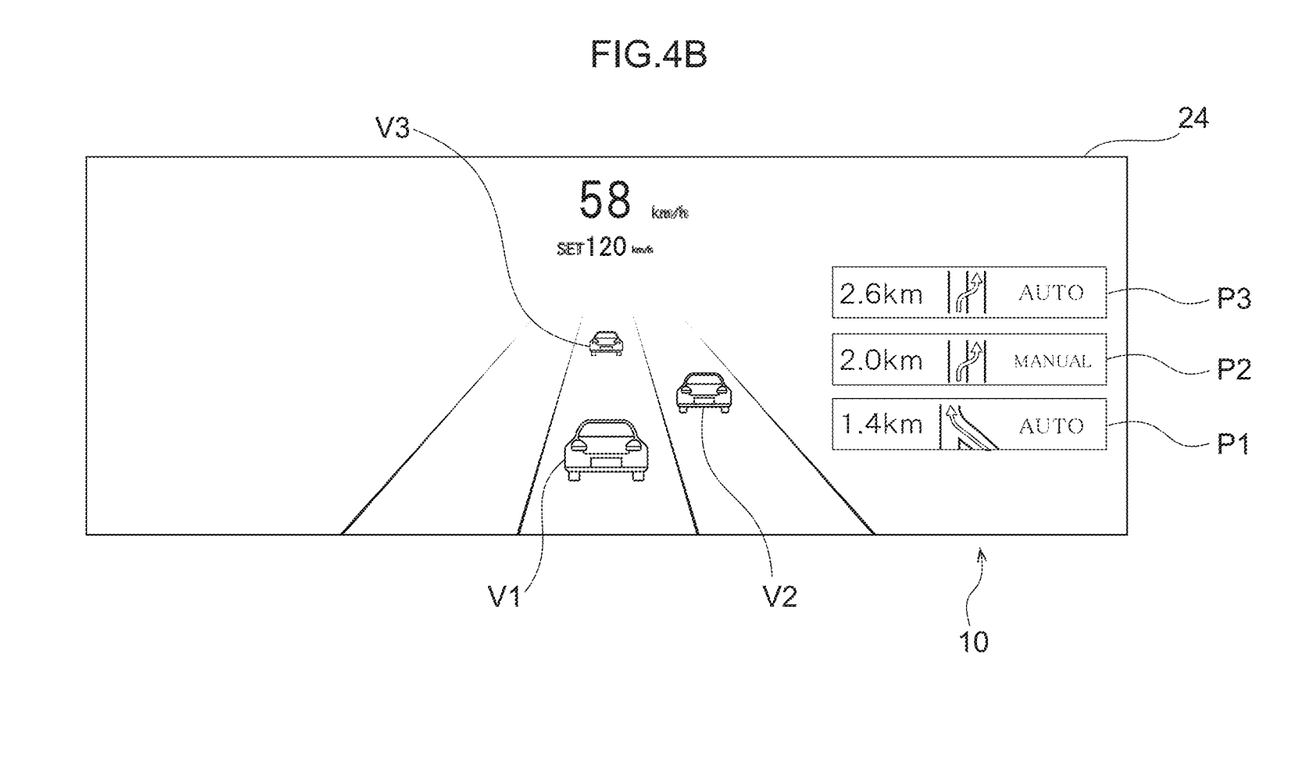
FIG. 4B is a diagram illustrating an example of a display on a first display device.

As illustrated in FIG. 4B, a set cruise control speed and the current speed of the vehicle 12 are displayed in an upper part of a display region of the first display device 24. The set speed and the current vehicle speed are displayed in a vehicle width direction central part of the display region of the first display device 24. The set speed is displayed in a smaller font in a lower row, and is set to 120 km/h as an example. The current vehicle speed is displayed in an upper row, and is displayed as 58 km/h. The vehicle 12 is thereby set to run at a speed of up to 120 km/h while maintaining a constant inter-vehicle distance from a vehicle in front.

An image V1 representing the device-installed vehicle, and an image V2 and an image V3 representing peripheral vehicles are displayed at a central part of the display region of the first display device 24. It can be understood from looking at the image V1 that the device-installed vehicle is running in the centermost lane out of three traffic lanes. The image V2 and the image V3 are both displayed based on information detected by various sensors mounted to the vehicle 12. It can be understood from looking at the image V2 and the image V3 that vehicles are respectively running at the oblique front-right of the device-installed vehicle, and in front of the device-installed vehicle. Note that the position of the device-installed vehicle may be detected by the GPS device installed in the vehicle 12. A combination of sensors, such as a stereo camera, an ultrasound sensor, millimeter-wave radar, and laser radar, are employed as the sensors to detect peripheral vehicles. Alternatively, the position of the device-installed vehicle and the positions of vehicles in the surroundings may be ascertained by vehicle-to-vehicle communication with the vehicles in the surroundings.

Scheduled actions of the vehicle 12 are displayed in a right end part of the display region of the first display device 24 by the first display instruction section 56. In the present exemplary embodiment as an example, a first scheduled action P1, a second scheduled action P2, and a third scheduled action P3 are displayed in bottom-up sequence. Three items of information are displayed for each of the scheduled actions, these being a distance from the current position to the position of the scheduled action, a scheduled running path, and a driving category. The driving category refers to whether the action is to be manually performed by the driver, or is to be performed by autonomous driving. In the present exemplary embodiment as an example, setting is made such that only three impending scheduled actions are displayed, and subsequent scheduled actions are not displayed. However, there is no limitation thereto. For example, four or more scheduled actions may be displayed on the first display device 24. Alternatively, the number of scheduled actions displayed on the first display device 24 may be freely settable.

Detailed explanation follows regarding the first scheduled action P1, the second scheduled action P2, and the third scheduled action P3. "1.4 km" is displayed at the left of the first scheduled action P1 to indicate that this action will be performed approximately 1400 m ahead of the current position. A graphic representation of a path merging with a main road from a side road on the right is displayed at the center of the first scheduled action P1, enabling the scheduled running path to be ascertained from the graphic representation. "AUTO" is displayed at the right of the first scheduled action P1 to indicate that this action will be performed by autonomous driving.

The second scheduled action P2 is displayed above the first scheduled action P1. "2.0 km" is displayed at the left of the second scheduled action P2 to indicate that this action will be performed approximately 2000 m ahead of the current position. A graphic representation of a lane change from a left-hand lane to a right-hand lane is displayed at the center of the second scheduled action P2, enabling the scheduled running path to be ascertained from the graphic representation. "MANUAL" is displayed at the right of the second scheduled action P2 to indicate that this action will be performed by manual driving. Namely, a temporary handover from autonomous driving to manual driving will be performed before 2000 m has been run. Note that in the present exemplary embodiment as an example, the occupant only performs the lane change, and a switch is made back to autonomous driving after changing lanes.

The third scheduled action P3 is displayed above the second scheduled action P2. "2.6 km" is displayed at the left of the third scheduled action P3 to indicate that this action will be performed approximately 2600 m ahead of the current position. A graphic representation of a lane change from a left-hand lane to a right-hand lane is displayed at the center of the third scheduled action P3, enabling the scheduled running path to be ascertained from the graphic representation. "AUTO" is displayed at the right of the third scheduled action P3 to indicate that this action will be performed by autonomous driving.

Figure 5A:
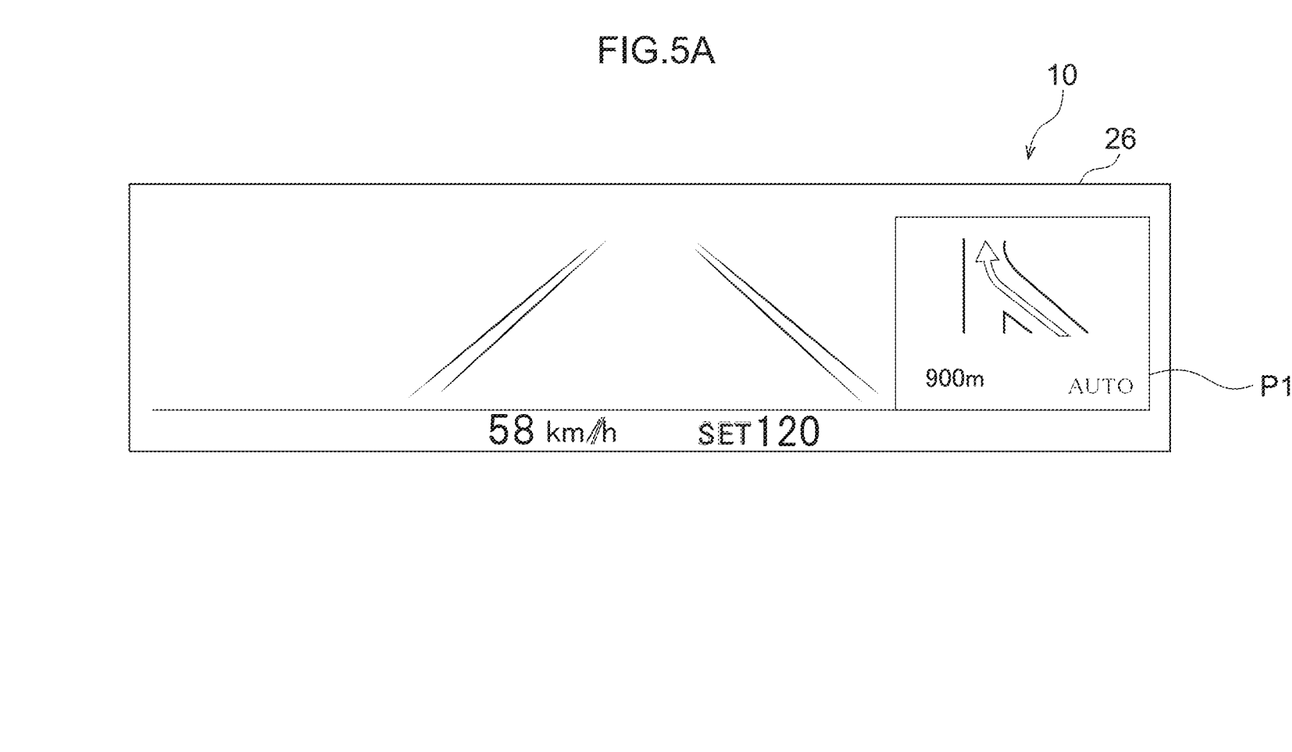
FIG. 5A is a diagram illustrating an example of a display on a second display device after advancing 500 m from the state in FIG. 4A.
Figure 5B:
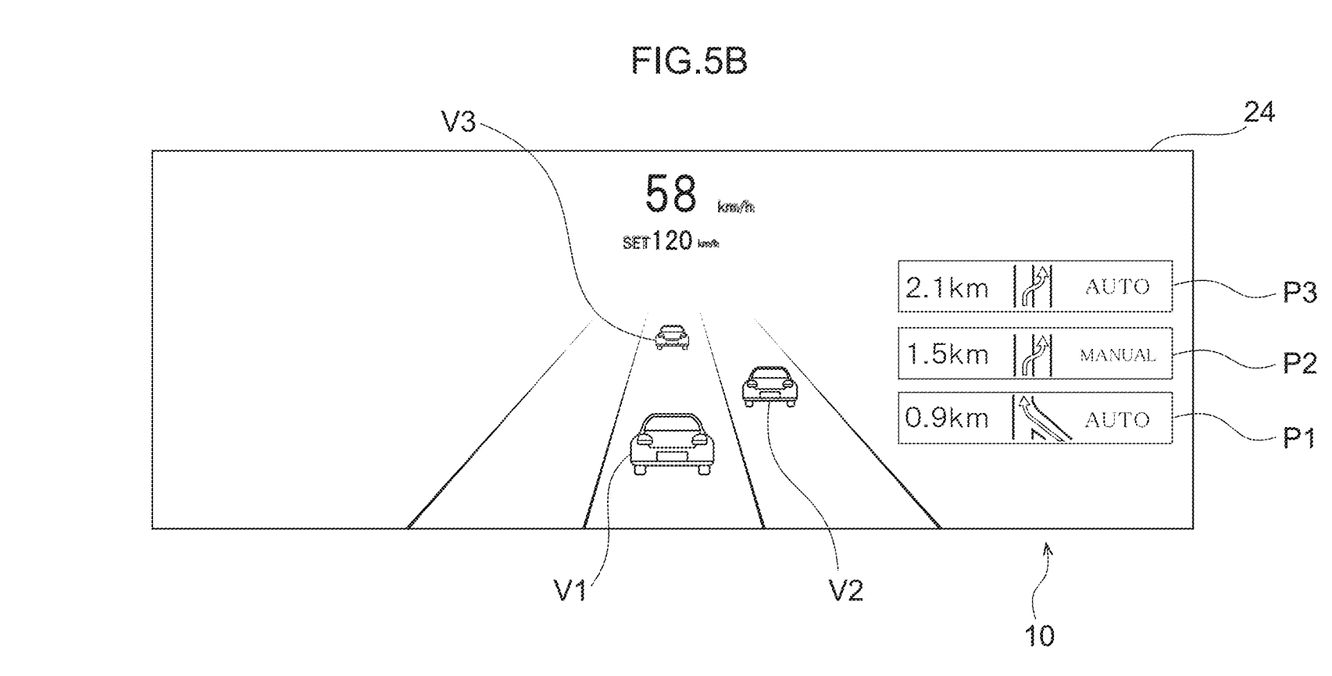
FIG. 5B is a diagram illustrating an example of a display on a first display device after advancing 500 m from the state in FIG. 4B.

FIG. 5B illustrates an image displayed on the first display device 24 in a state in which the vehicle 12 has run approximately 500 m from the state in FIG. 4B. As illustrated in FIG. 5B, the display at the left of the first scheduled action P1 has changed to "0.9 km", and the display at the left of the second scheduled action P2 has changed to "1.5 km". The display at the left of the third scheduled action P3 has changed to "2.1 km". Other display contents are the same as those in FIG. 4B.

Figure 6A:
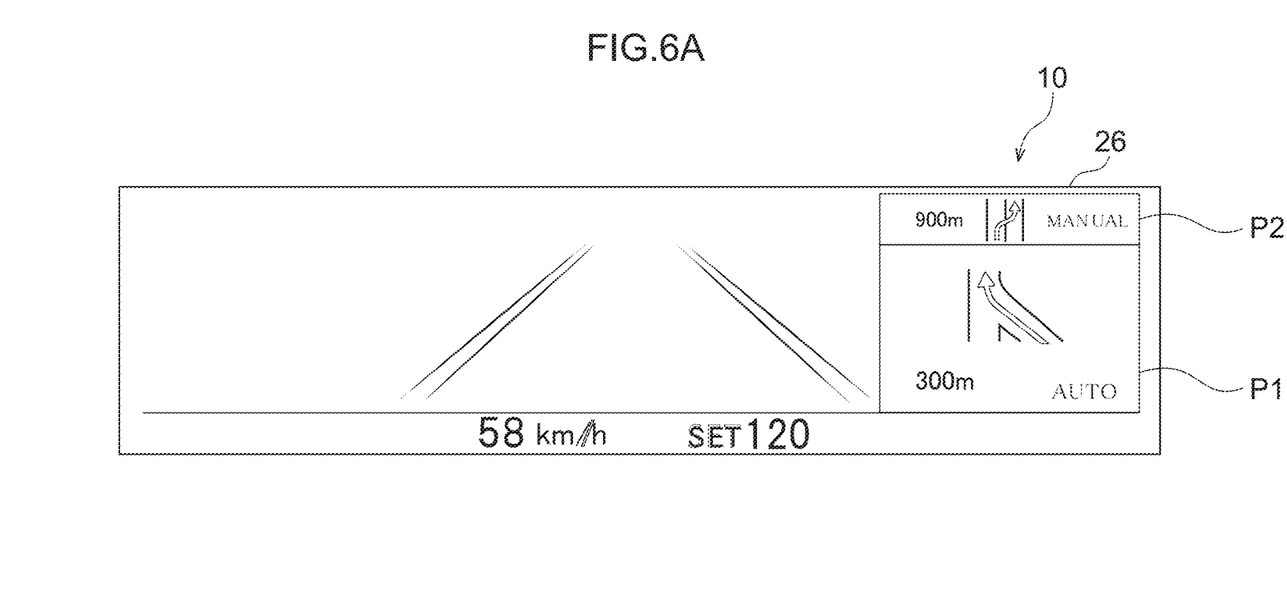
FIG. 6A is a diagram illustrating an example of a display on a second display device after advancing 600 m from the state in FIG. 5A.
Figure 6B:
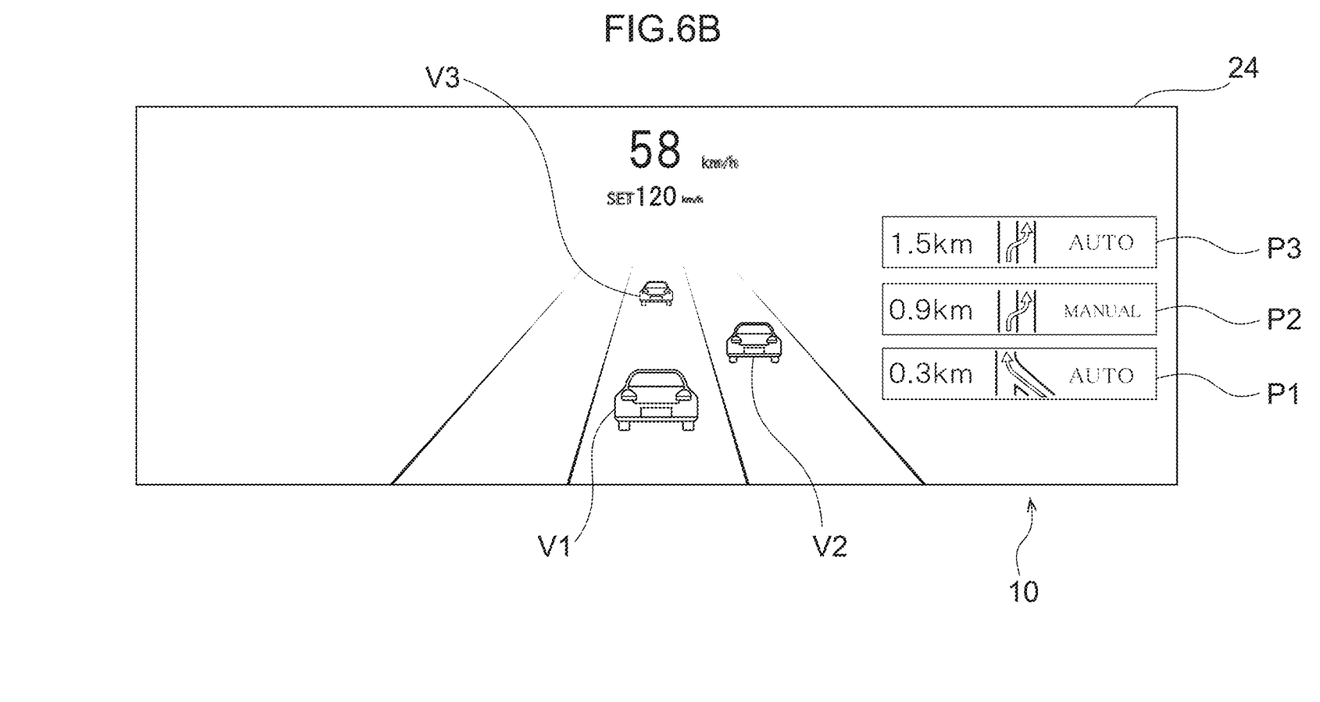
FIG. 6B is a diagram illustrating an example of a display on a first display device after advancing 600 m from the state in FIG. 5B.

FIG. 6B illustrates an image displayed on the first display device 24 in a state in which the vehicle 12 has run approximately 600 m from the state in FIG. 5B. As illustrated in FIG. 6B, the display at the left of the first scheduled action P1 has changed to "0.3 km", and the display at the left of the second scheduled action P2 has changed to "0.9 km". The display at the left of the third scheduled action P3 has changed to "1.5 km". Other display contents are the same as those in FIG. 5B. Note that in the present exemplary embodiment as an example, the display of distance for each scheduled action is set so as to change in decrements of 0.1 km as the vehicle 12 approaches the scheduled action.

As illustrated in FIG. 3, the functional configuration of the vehicle display device 10 includes the second display instruction section 58. Of the scheduled actions displayed on the first display device 24 by the first display instruction section 56, the second display instruction section 58 displays on the second display device 26 a scheduled action for which at least one out of a distance or a time interval to the action has reached a prescribed value or less. In cases in which there is no scheduled action for which at least one out of the distance or the time interval to the action has reached the prescribed value or less, the second display instruction section 58 displays on the second display device 26 the most imminent scheduled action out of the scheduled actions displayed on the first display device 24 by the first display instruction section 56. Note that in the present exemplary embodiment as an example, the second display instruction section 58 displays a scheduled action on the second display device 26 in cases in which the distance to the scheduled action has come to within 1000 m.

In cases in which the distance to a scheduled action has come to within 1000 m, the emphatic display section 60 emphasizes display of this scheduled action on the second display device 26. Moreover, in cases in which plural scheduled actions are displayed on the second display device 26, the emphatic display section 60 emphasizes display of the closest scheduled action over the other scheduled actions on the second display device 26. Explanation follows regarding the functionality of the second display instruction section 58 and the emphatic display section 60, with reference to FIG. 4A, FIG. 5A, and FIG. 6A.

As illustrated in FIG. 4A, the set cruise control speed and the current speed of the vehicle 12 are displayed in a lower part of a display region of the second display device 26. The set speed and the current vehicle speed are displayed in a vehicle width direction central part of the display region of the second display device 26. The set speed is displayed in a smaller font on the right, and is set to 120 km/h as an example. The current vehicle speed is displayed on the left, and is displayed as 58 km/h. The vehicle 12 is thereby set to run at a speed of up to 120 km/h while maintaining a constant inter-vehicle distance from the vehicle in front. Note that the display of the set speed and the current vehicle speed are synchronized with the contents of the first display device 24.

The first scheduled action P1 of the vehicle 12 is displayed at a right end part of the display region of the second display device 26 by the second display instruction section 58. Note that as illustrated in FIG. 4B, since the distance to the most imminent scheduled action is greater than 1000 m, the second display instruction section 58 displays the first scheduled action P1, this being the most imminent scheduled action, on the second display device 26.

In the illustration of FIG. 5A, the distance to the first scheduled action P1 displayed by the second display instruction section 58 has become 900 m. In cases in which the distance to the scheduled action is within 1000 m as in this case, the first scheduled action P1 is emphatically displayed by the emphatic display section 60.

In FIG. 6A, the distance to the second scheduled action P2 has become 900 m. In cases in which plural scheduled actions have come to within 1000 m as in this case, the second display instruction section 58 displays both the first scheduled action P1 and the second scheduled action P2 on the second display device 26. Moreover, the emphatic display section 60 emphatically displays the first scheduled action P1 that is scheduled most imminently. To explain this in more detail, the first scheduled action P1 is displayed with a larger size than the second scheduled action P2.

Note that when the vehicle 12 has run 300 m or more from the state in FIG. 6 so as to pass the location of the first scheduled action P1, the first scheduled action P1 is cleared from the first display device 24 and the second display device 26.

Operation

Explanation follows regarding operation of the present exemplary embodiment.

Display Processing

Figure 7:
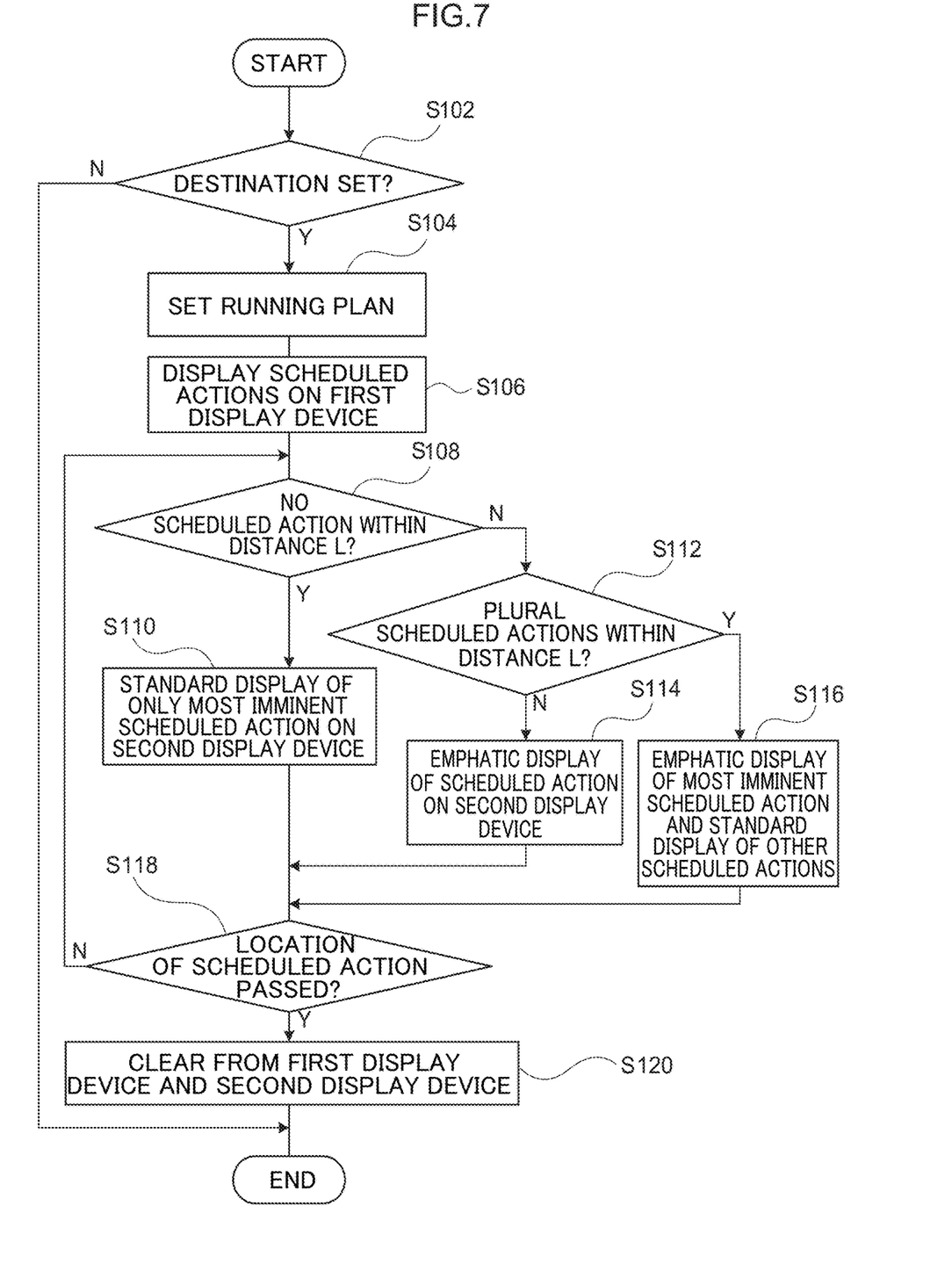
FIG. 7 is a flowchart illustrating an example of a flow of display processing of an exemplary embodiment.

Explanation follows regarding an example of the display processing to display scheduled actions of the vehicle 12 based on a running plan, with reference to the flowchart illustrated in FIG. 7. The display processing is executed by the CPU 30 reading a display program from the ROM 32 or the storage 36 and expanding and executing the display program in the RAM 34.

As illustrated in FIG. 7, at step S102, the CPU 30 determines whether or not a destination has been set. The destination may be input to the vehicle 12 directly by an occupant, or may be input indirectly using a portable terminal or the like.

In cases in which the CPU 30 determines that the destination has been set at step S102, processing transitions to step S104. In cases in which the CPU 30 determines that the destination has not been set at step S102, the display processing is ended.

At step S104, the CPU 30 sets a running plan of the vehicle 12. To explain this in more detail, the CPU 30 uses the functionality of the running plan setting section 52 to set a running plan from the current location to the destination. Information relating to traffic conditions, accidents, and the like may be acquired and reflected when setting the running plan. Moreover, the running plan may be set so as to include a large degree of autonomous driving according to preferences of an occupant that have been input in advance.

At step S106, the CPU 30 displays scheduled actions on the first display device 24. To explain this in more detail, the CPU 30 uses the functionality of the first display instruction section 56 to display scheduled actions of the vehicle 12 on the first display device 24 based on the running plan. As illustrated in FIG. 4B as an example, the CPU 30 displays three scheduled actions, these being the first scheduled action P1, the second scheduled action P2, and the third scheduled action P3, in the right end part of the display region of the first display device 24.

As illustrated in FIG. 7, at step S108, the CPU 30 determines whether or not there is no scheduled action within a prescribed distance L. The distance L is set to 1000 m as an example, and so at step S108 the CPU 30 determines whether or not there is no scheduled action within 1000 m. In cases in which there is no scheduled action within 1000 m, the CPU 30 transitions to the processing of step S110. In cases in which there is a scheduled action within 1000 m, the CPU 30 transitions to the processing of step S112.

At step S110, the CPU 30 performs standard display of only the most imminent scheduled action on the second display device 26. To explain this in more detail, the CPU 30 uses the functionality of the second display instruction section 58 to display on the second display device 26 only the most imminent scheduled action out of the scheduled actions displayed on the first display device 24. Note that the standard display referred to here is a display format that is not emphatic display, and refers to a state such as that illustrated in FIG. 4A, in which only the first scheduled action P1 is displayed on the second display device 26, using the standard display.

In cases in which there is a scheduled action within 1000 m, the CPU 30 transitions to the processing of step S112. At step S112, the CPU 30 determines whether or not there are plural scheduled actions within 1000 m. In cases in which there are plural scheduled actions within 1000 m amongst the scheduled actions displayed on the first display device 24, the CPU 30 transitions to the processing of step S116. In cases in which there is only one scheduled action within 1000 m, the CPU 30 transitions to the processing of step S114.

In cases in which there is only one scheduled action within 1000 m, at step S114, the CPU 30 emphatically displays this scheduled action on the second display device 26. To explain this in more detail, as illustrated in FIG. 5A, the CPU 30 uses the functionality of the second display instruction section 58 and the emphatic display section 60 to enlarge the display of the first scheduled action P1 on the second display device 26.

In cases in which there are plural scheduled actions within 1000 m, at step S116, the CPU 30 emphatically displays the most imminent scheduled action, and performs standard display of the other scheduled actions. To explain this in more detail, as illustrated in FIG. 6A, the CPU 30 uses the functionality of the second display instruction section 58 and the emphatic display section 60 to enlarge the display of the first scheduled action P1 on the second display device 26. The CPU 30 also performs standard display of the second scheduled action P2 above the first scheduled action P1 on the second display device 26. The second scheduled action P2 is thereby displayed in a smaller size than the first scheduled action P1.

As illustrated in FIG. 7, after the corresponding step S110, step S114, or step S116, the CPU 30 transitions to the processing of step S118. At step S118, the CPU 30 determines whether or not the vehicle 12 has passed the location of the relevant scheduled action. To explain this in more detail, the CPU 30 determines whether or not the vehicle 12 has passed the location of the relevant scheduled action based on a relationship between the position of the device-installed vehicle as identified by the GPS device and the location of the scheduled action as set in map data based on the running plan. In cases in which determination is made that the vehicle 12 has passed the location of the scheduled action, the CPU 30 transitions to the processing of step S120. In cases in which determination is made that the vehicle 12 has not passed the location of the scheduled action at step S118, namely, in cases in which determination is made that the location of the scheduled action has not yet been reached, the CPU 30 returns to the processing of step S108.

At step S120, the CPU 30 clears the corresponding scheduled action from the first display device 24 and the second display device 26 and ends the display processing. To explain this in more detail, when the location of the scheduled action has been passed, the CPU 30 clears display of the scheduled action from the first display device 24 and the second display device 26. For example, in cases in which the vehicle 12 has run approximately 400 m or more from the state in FIG. 6A and FIG. 6B, display of the first scheduled action P1 is cleared from the first display device 24 and the second display device 26.

When this is performed, since the first scheduled action P1 has been cleared from the first display device 24, the second scheduled action P2 is displayed at the bottom, and the third scheduled action P3 is displayed above the second scheduled action P2. The functionality of the first display instruction section 56 is used to display a scheduled action following on from the third scheduled action P3 above the third scheduled action P3.

Since the first scheduled action P1 is cleared from the second display device 26, the second scheduled action P2 is displayed at the bottom. Moreover, since the distance to the second scheduled action P2 is within 1000 m, the functionality of the emphatic display section 60 is used to enlarge the display of the second scheduled action P2. Note that since the distance to the third scheduled action P3 is greater than 1000 m, the third scheduled action P3 is not displayed on the second display device 26.

As described above, in the vehicle display device 10 according to the present exemplary embodiment, scheduled actions of the vehicle are displayed on the first display device 24 based on the set running plan. This enables the occupant to ascertain the running plan by looking at the first display device 24.

Moreover, of the scheduled actions displayed on the first display device 24, a scheduled action for which at least one out of the distance or the time interval to the action has reached a prescribed value or less (within 1000 m in this case) is displayed on the second display device 26. This enables the occupant to check just impending scheduled actions of the vehicle by looking at the second display device 26. This enables the occupant to rapidly ascertain the scheduled actions of the vehicle.

Furthermore, in the present exemplary embodiment, impending scheduled actions of the vehicle 12 are displayed by being projected by the second display device 26 on the projection surface located above the first display device 24 in the vehicle. This enables the occupant to check the impending scheduled actions of the vehicle 12 without greatly altering their gaze while driving. Namely, the occupant is able to easily ascertain the impending scheduled actions of the vehicle.

Furthermore, in the present exemplary embodiment, the occupant is able to ascertain the most imminent scheduled action by looking at the content that is emphatically displayed. Namely, this enables the occupant to check information regarding the most imminent scheduled action in an intuitive manner.

Moreover, in the present exemplary embodiment, in addition to displaying the distance of the vehicle 12 from the action and the scheduled running path of the vehicle, whether the action is to be performed manually by the driver or whether the action is to be performed by autonomous driving is also displayed for the scheduled action. This enables the occupant to ascertain at a glance whether or not they will need to perform driving themselves. Namely, in the vehicle 12 that is configured so as to be capable of switching between autonomous driving and manual driving, the occupant is not left uncertain as to whether or not they will need to perform driving themselves.

Furthermore, in the present exemplary embodiment, clearing completed scheduled actions from the second display device 26 enables the amount of information displayed on the second display device 26 to be kept to the minimum required. This enables the amount of information displayed on the second display device 26 to be reduced compared to cases in which completed scheduled actions are not cleared for a specific duration. This eliminates the need for the occupant to spend a long time looking at the second display device 26.

A vehicle display device and program according to an exemplary embodiment have been explained above. However, various modifications may be implemented within a range not departing from the spirit of the present disclosure. For example, in the above exemplary embodiment the first display device 24 is provided to the instrument panel 14 so as to be at the vehicle front side of the driving seat, and the second display device 26 is configured by the head up display device 44 that projects onto the projection surface. However, there is no limitation thereto. Namely, the first display device may be a central display provided at a vehicle width direction central portion of the instrument panel 14. A projection surface projected onto by the second display device may be provided on the instrument panel 14 so as to be at the vehicle front side of the steering wheel 16.

Moreover, in the above exemplary embodiment, the second display instruction section 58 performs display on the second display device 26 in cases in which the distance to a scheduled action has come to within 1000 m. However, there is no limitation thereto. For example, the second display instruction section 58 may perform display on the second display device 26 in cases in which the distance to a scheduled action has come to within 1500 m, or may perform display on the second display device 26 in cases in which the distance to a scheduled action has come to within 500 m. Alternatively, for example, the second display instruction section 58 may perform display on the second display device 26 in cases in which the time interval to a scheduled action is less than a prescribed duration. In such cases, the time interval to the scheduled action may be computed based on the speed of the vehicle 12 and the distance to the scheduled action, and this time interval may be displayed on the first display device 24 and the second display device 26. Furthermore, threshold values may be set for both the distance and the time interval to a scheduled action, and the second display instruction section 58 may display the scheduled action on the second display device 26 in cases in which either the distance or the time interval has reached the corresponding threshold value or less.

Furthermore, in the above exemplary embodiment, the emphatic display section 60 performs emphatic display by making the display larger than normal. However, there is no limitation thereto, and emphatic display may be performed by another method. For example, emphatic display may be performed by changing the color and tone. Alternatively, emphatic display may be performed by a method such as flashing or increasing the brightness of a section where the scheduled action is displayed.

Furthermore, in the above exemplary embodiment, three items of information, these being the distance to the action of the vehicle 12, the scheduled running path of the vehicle, and the driving category, are displayed for each scheduled action. However, there is no limitation thereto. For example, information such as the speed limit may also be displayed. However, from the perspective of the ease of viewing of the display, display is preferably limited to only the three items of information mentioned above. Moreover, display of the scheduled running path is not limited to the graphic representations illustrated in FIG. 4A to FIG. 6B, and display may be performed using other icons or the like.

Moreover, in the above exemplary embodiment, the second display instruction section 58 displays up to two impending scheduled actions on the second display device 26. However, there is no limitation thereto. For example, the second display instruction section 58 may display three or more impending scheduled actions on the second display device 26.

Note that the display processing executed by the CPU 30 reading and executing software (a program) in the above exemplary embodiment may be executed by various types of processor other than the CPU 30. Such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). The display processing may be executed by any one of these various types of processor, or by a combination of two or more of the same type or different types of processor (such as plural FPGAs, or a combination of a CPU and an FPGA). The hardware structure of these various types of processors is more specifically an electric circuit combining circuit elements such as semiconductor elements.

Furthermore, in the above exemplary embodiment, the various data is stored in the storage 36. However, there is no limitation thereto. A non-transitory recording medium such a compact disc (CD), a digital versatile disc (DVD), or universal serial bus (USB) memory may serve as a storage section. In such cases, the various programs, data, and so on are held in the non-transitory recording medium.

An object of the present disclosure is to obtain a vehicle display device, a vehicle display method and a non-transitory recording medium recording a vehicle display program therein that enable an occupant to rapidly ascertain a scheduled action of a vehicle.

A first aspect is a vehicle display device, that includes: a first display device provided inside a vehicle cabin; a second display device provided inside the vehicle cabin and separately from the first display device; a memory; and a processor connecting to the memory and being configured to: set a running plan of a vehicle, to display a scheduled action of the vehicle on the first display device based on the running plan, and to display the scheduled action on the second display device in a case in which at least one of a distance to, or a time interval until, the scheduled action has reached a prescribed value or less.

In the vehicle display device of the first aspect, the first display device is provided inside the vehicle cabin. The second display device is also provided inside the vehicle cabin, separately to the first display device. The vehicle display device sets the running plan of the vehicle, and displays the scheduled action of the vehicle on the first display device based on the running plan. This enables the occupant to ascertain the running plan by looking at the first display device.

The vehicle display device also displays the scheduled action on the second display device when at least one of the distance or the time interval to the action of this scheduled action has reached the prescribed value or less. This enables the occupant to check just impending scheduled actions of the vehicle by looking at the second display device.

A second aspect is the vehicle display device of the first aspect, wherein: the first display device is provided at an instrument panel, at a vehicle front side of a driving seat; and the second display device is a heads-up display device configured to project onto a projection surface at a vehicle upper side of the first display device.

In the vehicle display device of the second aspect, an impending scheduled action of the vehicle is displayed on the projection surface at the vehicle upper side of the first display device. This enables the occupant to check the impending scheduled action of the vehicle without greatly altering their gaze while driving.

A third aspect is the vehicle display device of the first or the second aspect, wherein, in a case in which a plurality of scheduled actions are displayed on the second display device, the earliest of the scheduled actions is displayed more emphatically than another of the scheduled actions.

In the vehicle display device of the third aspect, the occupant is able to ascertain the most imminent scheduled action by looking at the content that is emphatically displayed.

A fourth aspect is the vehicle display device of any one of the first to the third aspects, wherein: the vehicle is switchable between autonomous driving and manual driving; and with the scheduled action, whether the scheduled action is to be manually performed by a driver or to be performed by autonomous driving is displayed, in addition to the distance to the scheduled action and a scheduled running path of the vehicle.

The vehicle display device of the fourth aspect displays the distance of the vehicle from the action and the scheduled running path of the vehicle. The vehicle display device also displays whether the action is to be performed manually by the driver or whether the action is to be performed by autonomous driving. This enables the occupant to ascertain at a glance whether or not they will need to perform driving themselves. Note that "an action to be performed manually by the driver" is a concept not limited to cases in which a switch is made to full manual driving, and more broadly includes cases in which certain elements of a driving operation are performed manually during autonomous driving. For example, this includes cases in which actions relating only to lane changing, turning onto a different road, and merging are performed manually.

A fifth aspect is the vehicle display device of any one of the first to the fourth aspects, wherein the scheduled action is cleared from the second display device in a case in which a location or a timing of the scheduled action has been passed.

In the vehicle display device of the fifth aspect, clearing completed scheduled actions from the second display device enables the amount of information displayed on the second display device to be kept to the minimum required.

A sixth aspect is a non-transitory recording medium that records a program that is executable by a computer to perform processing, the processing including: setting a running plan of a vehicle; displaying a scheduled action of the vehicle on a first display device provided inside a vehicle cabin based on the running plan; and displaying the scheduled action on a second display device provided inside the vehicle cabin and separately from the first display device in a case in which at least one of a distance to, or a time interval until, the scheduled action has reached a prescribed value or less.

In the program of the sixth aspect, the scheduled action of the vehicle is displayed on the first display device based on the set running plan. Of the scheduled actions displayed on the first display device, a scheduled action for which at least one of the distance or the time interval to the action has reached a prescribed value or less is displayed on the second display device. This enables display of only impending scheduled actions of the vehicle on the second display device.

The vehicle display device of the first aspect enables an occupant to rapidly ascertain a scheduled action of the vehicle.

The vehicle display device of the second aspect enables the occupant to easily ascertain impending scheduled actions of the vehicle.

The vehicle display device of the third aspect enables the occupant to check information regarding the most imminent scheduled action in an intuitive manner.

The vehicle display device of the fourth aspect enables the occupant not to be left uncertain as to whether or not they will need to perform driving themselves in a vehicle configured so as to be capable of switching between autonomous driving and manual driving.

The vehicle display device of the fifth aspect enables the amount of information displayed on the second display device to be reduced compared to cases in which completed scheduled actions are not cleared for a specific duration.

The program of the sixth aspect enables an occupant to rapidly ascertain a scheduled action of the vehicle.

The invention claimed is:

1. A vehicle display device, comprising:
a first display device provided inside a cabin of a vehicle;

a second display device provided above the first display device, inside the cabin, and separately from the first display device;
wherein the vehicle is switchable between autonomous and manual driving modes;
a memory; and
a processor connecting to the memory and being configured to:
set a running plan of the vehicle;
display a plurality of scheduled actions of the vehicle based on the running plan on the first display device,
display a part of the plurality of scheduled actions on the second display device in a case in which at least one of a distance to or a time interval until, a scheduled action of the plurality of scheduled actions has reached a prescribed value or less,
further display on the display devices whether the part of plurality of the scheduled action and plurality of the scheduled action are to be manually performed by a driver or to be performed by autonomous driving; and
wherein the plurality of scheduled actions of the vehicle is displayed in an end part of the first display and the part of the plurality of scheduled actions is displayed in an end part of the second display corresponding to the end part of the first display.

2. The vehicle display device of claim 1, wherein:
the first display device is provided at an instrument panel in front of a driving seat; and
the second display device is a heads-up display device configured to project onto a projection surface.

3. The vehicle display device of claim 1, wherein an earliest of the plurality of scheduled actions is displayed more emphatically than another of the plurality of scheduled actions.

4. The vehicle display device of claim 1, wherein the processor is further configured to further display on the display devices the distance to the scheduled action and a scheduled running path of the vehicle.

5. The vehicle display device of claim 1, wherein the scheduled action of the part of the plurality of scheduled actions is cleared from the second display device in a case in which a location or a timing of the scheduled action has been passed.

6. The vehicle display device of claim 1, the processor is configured to display the part of the plurality of scheduled actions on the second display device in the case in which the time interval until, the scheduled action of the plurality of scheduled actions has reached the prescribed value or less.

7. A vehicle display method, comprising:
by a processor,
setting a running plan of a vehicle;
displaying a plurality of scheduled actions of the vehicle on a first display device provided inside a vehicle cabin based on the running plan;
wherein the vehicle is switchable between autonomous and manual driving modes; and
displaying a part of the plurality of scheduled actions on a second display device in a case in which at least one of a distance to or a time interval until a scheduled action of the plurality of scheduled actions has reached a prescribed value or less,
further displaying on the display devices whether the part of plurality of the scheduled action and plurality of the scheduled action are to be manually performed by a driver or to be performed by autonomous driving; and wherein the second display device is provided at above the first display device, inside the vehicle cabin, and separately from the first display device,
wherein the plurality of scheduled actions of the vehicle is displayed in an end part of the first display and the part of the plurality of scheduled actions is displayed in an end part of the second display corresponding to the end part of the first display.

8. The vehicle display method of claim 7, wherein an earliest of the plurality of scheduled actions is displayed more emphatically than another of the plurality of scheduled actions.

9. The vehicle display method of claim 7, wherein the display devices further display the distance to the scheduled action and a scheduled running path of the vehicle.

10. The vehicle display method of claim 7, wherein the scheduled action of the part of the plurality of scheduled actions is cleared from the second display device in a case in which a location or a timing of the scheduled action has been passed.

11. The vehicle display method of claim 7, wherein displaying the plurality of scheduled actions on the second display device comprises displaying the plurality of scheduled actions in a case in which the time interval until the scheduled action of the plurality of scheduled actions has reached the prescribed value or less.

12. A non-transitory recording medium that records a program that is executable by a computer to perform processing, the processing comprising:
setting a running plan of a vehicle;
displaying a plurality of scheduled actions of the vehicle on a first display device provided inside a vehicle cabin based on the running plan;
wherein the vehicle is switchable between autonomous and manual driving modes; and
displaying a part of the plurality of scheduled actions on a second display device in a case in which at least one of a distance or a time interval until a scheduled action of the plurality of scheduled actions has reached a prescribed value or less, wherein the second display device is provided above the first display device, inside the vehicle cabin, and separately from the first display device,
further displaying on the display devices whether the part of plurality of the scheduled action and plurality of the scheduled action are to be manually performed by a driver or to be performed by autonomous driving; and
wherein the plurality of scheduled actions of the vehicle is displayed in an end part of the first display and the part of the plurality of scheduled actions is displayed in an end part of the second display corresponding to the end part of the first display.

13. The non-transitory recording medium of claim 12, wherein an earliest of the plurality of scheduled actions is displayed more emphatically than another of the plurality of scheduled actions.

14. The non-transitory recording medium of claim 12, wherein the display devices further display the distance to the scheduled action and a scheduled running path of the vehicle.

15. The non-transitory recording medium of claim 12, wherein the scheduled action of the part of the plurality of scheduled actions is cleared from the second display device in a case in which a location or a timing of the scheduled action has been passed.

16. The non-transitory recording medium of claim 12, wherein displaying the plurality of scheduled actions on the second display device comprises displaying the plurality of scheduled action in a case in which the time interval until the scheduled action of the plurality of scheduled actions has reached the prescribed value or less.

\* \* \* \* \*